(12) United States Patent
Sawano

(10) Patent No.: US 7,668,399 B2
(45) Date of Patent: Feb. 23, 2010

(54) APPARATUS AND METHOD FOR LAYING OUT IMAGES AND PROGRAM THEREFOR

(75) Inventor: Tetsuya Sawano, Asaka (JP)

(73) Assignee: Fujifilm Corporation, Tokyo (JP)

( * ) Notice: Subject to any disclaimer, the term of this patent is extended or adjusted under 35 U.S.C. 154(b) by 735 days.

(21) Appl. No.: 11/369,990

(22) Filed: Mar. 8, 2006

(65) Prior Publication Data
US 2006/0204129 A1    Sep. 14, 2006

(30) Foreign Application Priority Data
Mar. 10, 2005    (JP) .............................. 2005-066695

(51) Int. Cl.
G06K 9/36    (2006.01)
G06K 9/00    (2006.01)

(52) U.S. Cl. ...................... 382/276; 382/162; 382/284; 382/286

(58) Field of Classification Search ................. 382/276, 382/284; 715/517
See application file for complete search history.

(56) References Cited

U.S. PATENT DOCUMENTS

| 4,949,287 | A | * | 8/1990 | Yamaguchi et al. ......... 715/246 |
| 5,563,722 | A | * | 10/1996 | Norris .......................... 358/453 |
| 6,396,963 | B2 | * | 5/2002 | Shaffer et al. ................ 382/305 |
| 6,891,539 | B1 | * | 5/2005 | Maruyama et al. .......... 345/629 |
| 7,203,380 | B2 | * | 4/2007 | Chiu et al. ................... 382/284 |
| 7,340,676 | B2 | * | 3/2008 | Geigel et al. ................ 715/716 |
| 7,515,154 | B2 | * | 4/2009 | Tanaka et al. ............... 345/473 |
| 2003/0174869 | A1 | * | 9/2003 | Suarez ....................... 382/118 |
| 2007/0143714 | A1 | * | 6/2007 | Barbieri ..................... 715/861 |

FOREIGN PATENT DOCUMENTS

| JP | 9-214868 | 8/1997 |
| JP | 2000-235466 | 8/2000 |
| JP | 2000-299777 | 10/2000 |

* cited by examiner

*Primary Examiner*—Brian P Werner
*Assistant Examiner*—Jose M Torres
(74) *Attorney, Agent, or Firm*—McGinn IP Law Group, PLLC

(57) ABSTRACT

A layout image is generated by laying out images in a background area according to a predetermined rule. An instruction to edit the layout image is received from a user, and the layout image is edited. Based on a result of editing according to the instruction, user preference information representing preference of the user is generated. The user preference information is fed back in subsequent layout image generation.

20 Claims, 7 Drawing Sheets

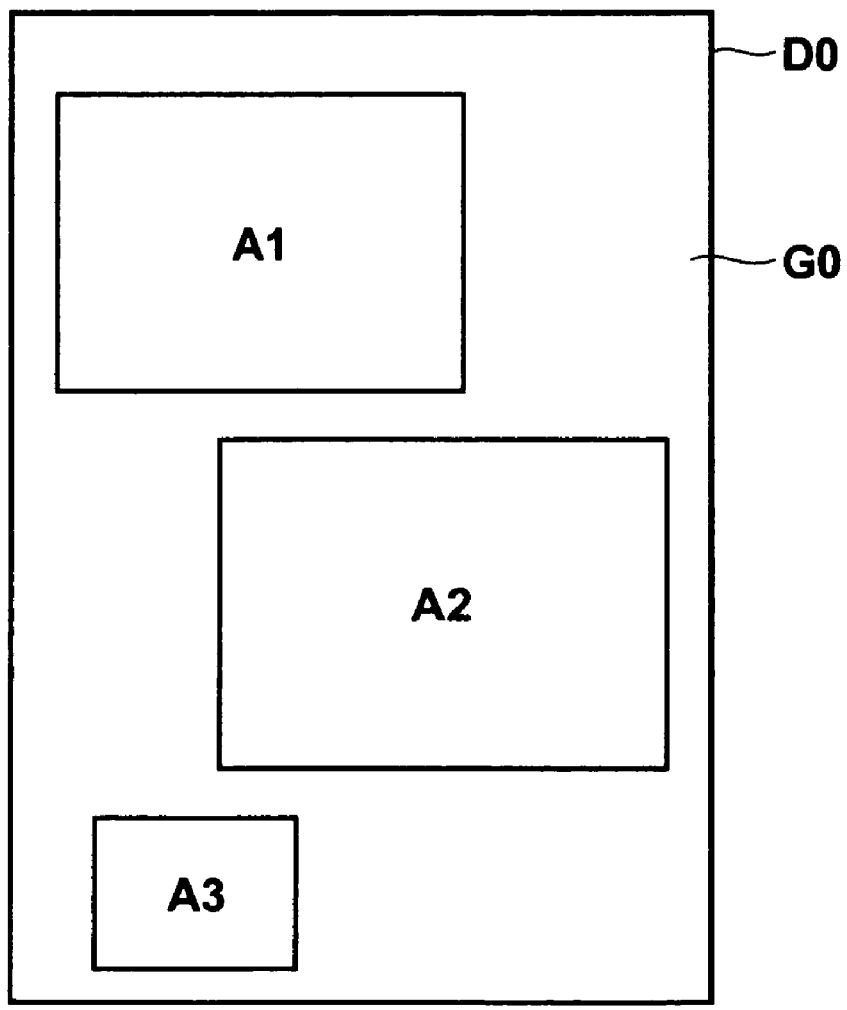

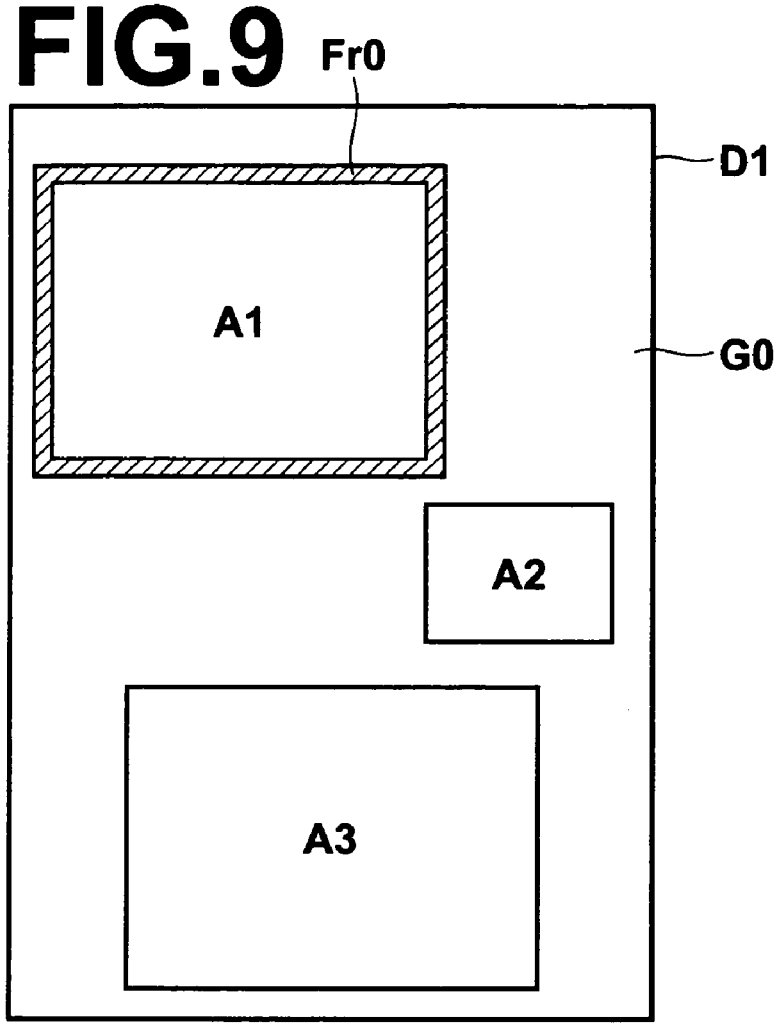

NUMBER OF IMAGES : 6    —F2

APPARATUS AND METHOD FOR LAYING OUT IMAGES AND PROGRAM THEREFOR

BACKGROUND OF THE INVENTION

1. Field of the Invention

The present invention relates to an apparatus and a method for generating a layout image by laying out images in a background area, and to a program for causing a computer to execute the method.

2. Description of the Related Art

Generation of photograph album prints has conventionally been carried out by printing images laid out on single sheets. By laying out images on individual sheets, a photograph album can be generated easily, since prints do not need to be pasted later on a photo mount.

However, an attractive image layout requires special knowledge, and laying out images is a time-consuming operation.

For this reason, various kinds of methods have been proposed for laying out images with ease (see Japanese Unexamined Patent Publications No. 9(1997)-214868 and 2000-299777). In a method described in Japanese Unexamined Patent Publication No. 9(1997)-214868, necessary and unnecessary images are specified by a user when the images are shown to the user, and only the necessary images are laid out. According to this method, a photograph album can also be printed easily by preparing a template for image insertion. In a method described in Japanese Unexamined Patent Publication No. 2000-299777, images are arranged according to time of photography thereof, and the images are laid out at positions preset according to the size and orientation of each of the images.

Another method has also been proposed regarding printing of a document (see Japanese Unexamined Patent Publication No. 2000-235466). In this method, a recommended printing condition that is pre-registered according to a purpose of printing is searched for in order to reduce trouble in a setting operation at the time of printing, and a manner of display is determined and shown based on the recommended printing condition in accordance with the printing purpose. According to this method, redundant operations such as explicit registration of settings can be omitted, and setting operations are carried out with ease.

However, in the methods described in Japanese Unexamined Patent Publications No. 9(1997)-214868 and 2000-299777, a user himself/herself needs to decide the layout of images, which is a troublesome operation for the user. Furthermore, in the method described in Japanese Unexamined Patent Publication No. 2000-299777, only layouts available according to combinations of image orientations can be used. Therefore, variations of the layouts are limited. In this case, the method in Japanese Unexamined Patent Publication No. 2000-235466 may be applied to the methods in Japanese Unexamined Patent Publications No. 9(1997)-214868 and 2000-299777 for easier layout operations. However, in the method described in Japanese Unexamined Patent Publication No. 2000-235466, functions and operations are fixed, and a user cannot freely lay images out. Therefore, the preferences of a user cannot be reflected.

SUMMARY OF THE INVENTION

The present invention has been conceived based on consideration of the above circumstances. An object of the present invention is therefore to lay out images easily with the preferences of a user reflected therein.

An image layout apparatus of the present invention comprises:

layout image generation means for carrying out layout image generation wherein a layout image is generated by laying out images in a background area according to a predetermined rule;

editing means for editing the layout image by receiving an instruction to edit the layout image from a user;

preference information generation means for generating user preference information representing the preferences of the user, based on a result of editing according to the instruction to edit; and feedback means for feeding back the user preference information into the layout image generation carried out at a subsequent time.

The image layout apparatus of the present invention may further comprise parameter calculation means for calculating parameters representing characteristics in quality of each of the images so that the preference information generation means can generate the user preference information based on the parameters of the images in edited image in addition to the result of editing.

The characteristics in image quality refer to a subject (such as a person or a landscape), lightness, contrast, sharpness, and a color tone of each of the images, for example.

The image layout apparatus of the present invention may further comprise weight calculation means for calculating a weight of each of the images as a sum of the parameters weighted by predetermined weight coefficients. In this case, if the predetermined rule is to lay out the images in the background area in such a manner that a size of each of the images becomes larger as the weight thereof becomes higher, and if the instruction to edit includes an instruction to delete, reduce, or enlarge a specific one of the images, the feedback means feeds back the user preference information into the weight coefficients.

In the case where the instruction to edit is an instruction to add a frame to a specific one of the images in the image layout apparatus of the present invention, the feedback means may feed back the user preference information into judgment as to whether a frame is added in advance to an image to be laid out.

In the image layout apparatus of the present invention, in the case where the instruction to edit includes an instruction to change the number of images to be laid out in the background area, the feedback means may feed back the user preference information into the number of images to be laid out in the background area.

An image layout method of the present invention comprises the steps of:

carrying out layout image generation wherein a layout image is generated by laying out images in a background area according to a predetermined rule;

editing the layout image by receiving an instruction to edit the layout image from a user;

generating user preference information representing the preferences of the user, based on a result of editing according to the instruction to edit; and feeding back the user preference information into the layout image generation carried out at a subsequent time.

The image layout method of the present invention may be provided as a program for causing a computer to execute the image layout method.

According to the present invention, the layout image is generated by laying out the images in the background area according to the predetermined rule, and the instruction to edit the layout image is received from the user. The user preference information is then generated based on the result of editing according to the instruction, and the user preference information is then fed back in the subsequent layout image generation.

Therefore, in the case where the layout image generation is carried out again based on images owned by the same user, the result of editing carried out by the user in the previous time is reflected in the subsequent layout image generation. Since the user preference information is the result of editing carried out by the user himself/herself, the user preference information reflects the preferences of the user. Consequently, according to the present invention, the preferences of the user can be reflected in the subsequent layout image generation. Furthermore, since the preferences of the user are reflected, the frequency of layout operations carried out by the user is reduced, and images can thus be laid out easily.

BRIEF DESCRIPTION OF THE DRAWINGS

FIG. 6 shows an example of user preference information in the first embodiment;

FIG. 7 shows an example of a layout image generated for the second time;

FIG. 9 shows an example of a layout image after editing in the second embodiment;

FIG. 10 shows an example of user preference information in the second embodiment;

DESCRIPTION OF THE PREFERRED EMBODIMENTS

Figure 1:
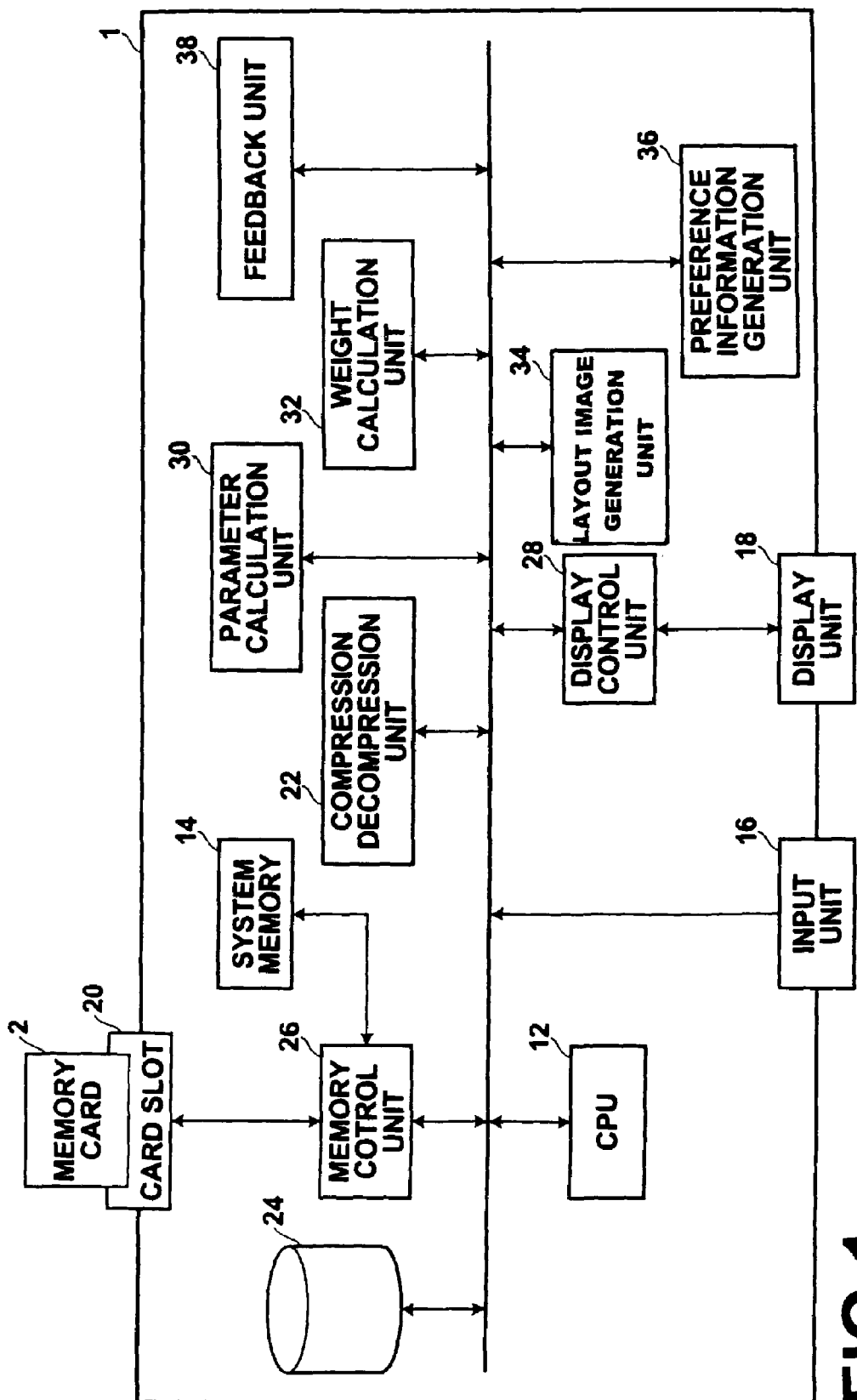
FIG. 1 is a block diagram showing the configuration of an image layout apparatus of a first embodiment of the present invention.

Hereinafter, embodiments of the present invention will be described with reference to the accompanying drawings. FIG. 1 is a block diagram showing the configuration of an image layout apparatus of a first embodiment of the present invention. As shown in FIG. 1, an image layout apparatus 1 in the first embodiment is installed in a DPE store or the like, and is operated by a user for laying out images owned by the user. The image layout apparatus 1 comprises a CPU 12, a system memory 14, an input unit 16, and a display unit 18. The CPU 12 carries out various kinds of control such as recording control, reading control, and display control of image data representing images. The CPU 12 also controls each unit comprising the image layout apparatus 1. The system memory 14 comprises a ROM for storing a program for operating the CPU 12, viewer software for viewing the images, and various kinds of constants. The system memory 14 also comprises a RAM used as a workspace for processing by the CPU 12. The input unit 16 comprises a keyboard, a mouse, and the like for inputting various instructions to the image layout apparatus 1. The display unit 18 comprises a liquid crystal display monitor or the like used for various kinds of display.

The image layout apparatus 1 also comprises a card slot 20 for reading an image from a memory card 2 and for storing an image in the memory card 2, a compression decompression unit 22 for compressing an image according to a method using JPEG or the like and for decompressing the compressed image, a hard disc 24 for storing images and various kinds of programs executed by the CPU 12, and background areas used as backgrounds for laying out images, a memory control unit 26 for controlling the system memory 14, the hard disc 24, and the card slot 20, and a display control unit 28 for controlling the display unit 18.

The image layout apparatus 1 further comprises a parameter calculation unit 30, a weight calculation unit 32, a layout image generation unit 34, a preference information generation unit 36, and a feedback unit 38, for carrying out image layout processing.

The parameter calculation unit 30 calculates parameters representing characteristics in image quality for all images stored in the memory card 2. The parameter calculation unit 30 firstly finds a parameter P1 for identifying a subject in each of the images. More specifically, the parameter calculation unit 30 judges whether a person is included in the image, and sets the parameter P1 to be 1 in the case where the image includes a person. Otherwise, the parameter calculation unit 30 sets the parameter P1 to be 0, to represent that the image is a landscape image. Judgment regarding whether a person is included can be realized by judging presence or absence of a skin colored area in the image. Alternatively, any known face recognition method may be used for judging the image to include a person in the case where a face is recognized thereby.

The parameter calculation unit 30 also calculates the luminance of each of the pixels in the image, and finds a mean thereof as a parameter P2 for lightness. The parameter calculation unit 30 finds a histogram of the image, and calculates a variance thereof with respect to a representative value (such as a mean or a median) thereof as a parameter P3 for contrast. The parameter calculation unit 30 carries out frequency transform such as discrete cosine transform, discrete Fourier transform, Haar transform, or wavelet transform on the image to detect a high frequency component therein, and uses an amount of the high frequency component as a parameter P4 for sharpness.

The weight calculation unit 32 multiplies the respective parameters P1 through P4 found by the parameter calculation unit 30 by corresponding predetermined weight coefficients W1 through W4, and adds results of the multiplication to find a weight L0 for the image as shown by Equation (1) below:

$$L0 = W1 \cdot P1 + W2 \cdot P2 + W3 \cdot P3 + W4 \cdot P4 \tag{1}$$

where $W1+W2+W3+W4=1$

The layout image generation unit 34 generates a layout image by laying out the images in a background area G0 according to predetermined rules. The predetermined rules in this embodiment are that 3 images are laid out in order of file name in the background area G0 corresponding to a sheet of A4 size used upon printing and that a size of each of the images becomes larger as the weight therefor becomes larger.

Figure 2:
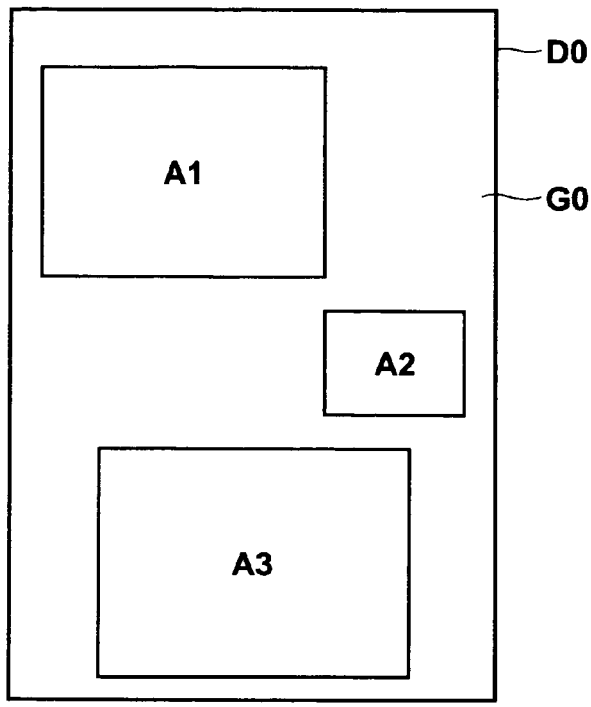
FIG. 2 shows an example of a layout image in the first embodiment.
Figure 3:
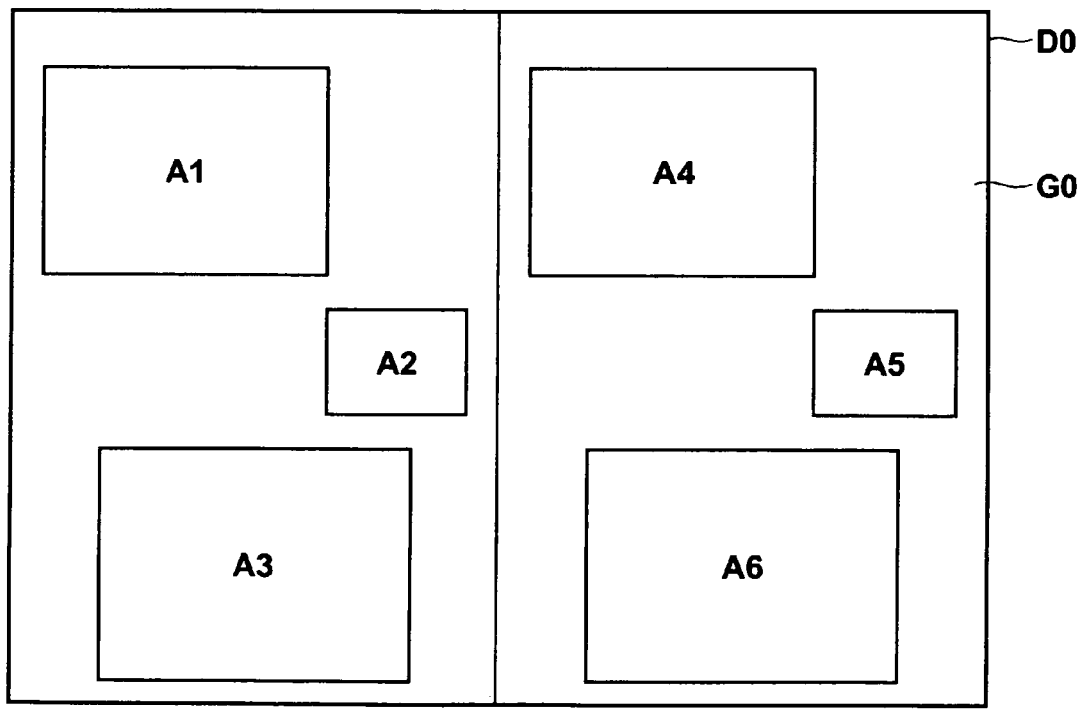
FIG. 3 shows another example of a layout image in the first embodiment.

For example, in the case of laying out 3 images A1 through A3 (whose file names are DSCF001.JPG, DSCF002.JPG and DSCF003.JPG) in the background area G0, the layout image generation unit 34 changes the size of each of the images to satisfy A1:A2:A3=6:3:7 if the weight for each of the images is 60, 30, and 70, respectively. The layout image generation unit 34 then generates a layout image D0 by laying out the images A1 through A3 from the top to the bottom of the area G0. FIG. 2 shows the layout image generated in this manner. In the case where the background area G0 has a plurality of pages as shown in FIG. 3, the layout image D0 having the pages (2 pages in this case) is generated.

The layout image generation unit 34 displays an editing screen including the layout image D0 on the display unit 18.

Figure 4:
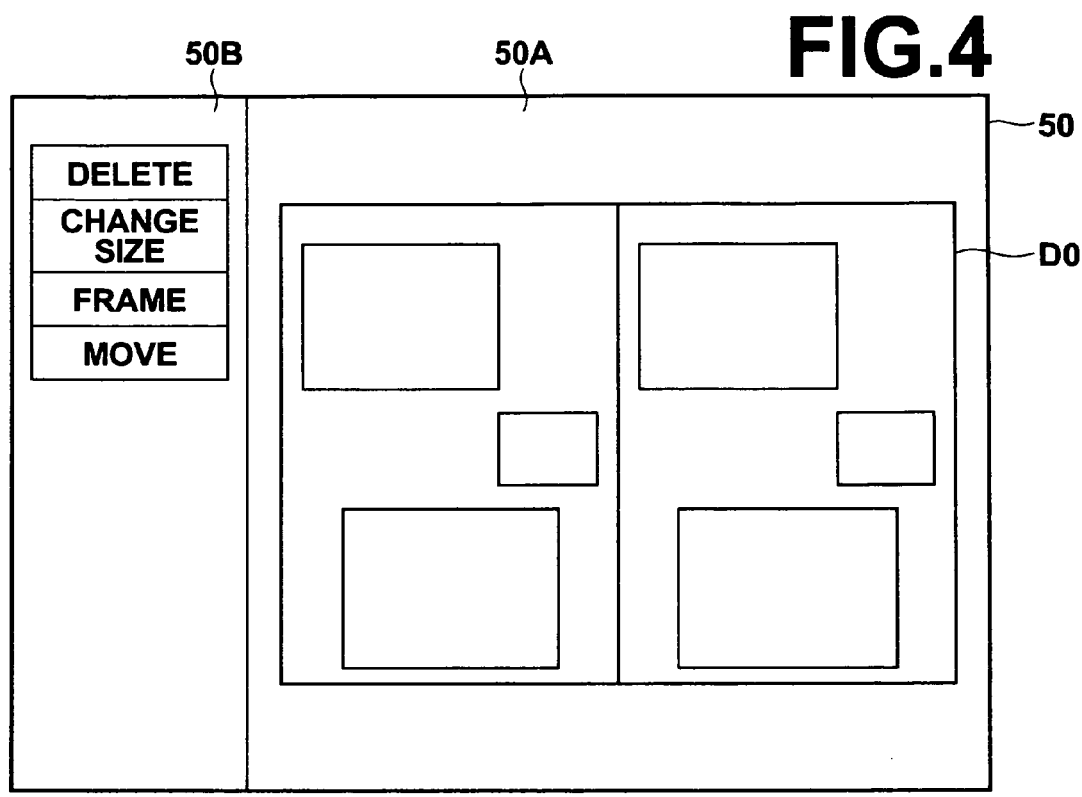
FIG. 4 shows an example of an editing screen.

FIG. 4 shows an example of the editing screen. As shown in FIG. 4, an editing screen 50 includes an image display field 50A for displaying the layout image D0, and a button display field 50B for displaying buttons used for various operations. In the button display field 50A are included a Delete button clicked for deleting an image, a Change Size button clicked for changing a size of an image, a Frame button clicked for adding a frame to an image, and a Move button clicked for moving an image. By clicking a desired one of the buttons after selecting a desired one of the images in the layout image D0, the user can edit the selected image according to the button having been clicked.

For example, if a desired one of the images is selected and the Delete button is clicked thereafter, the selected image can be deleted from the layout image D0. If the Change Size button is clicked, the size of the selected image can be changed. In the case where the Frame button is clicked, a frame is added to the selected image. In this case, a frame selection screen including a catalog of thumbnail images of frames is displayed for frame selection, and the user selects a desired one of the frames in the selection screen. By clicking the Move button, the selected image can be moved by a drag and drop operation thereon.

Figure 5:
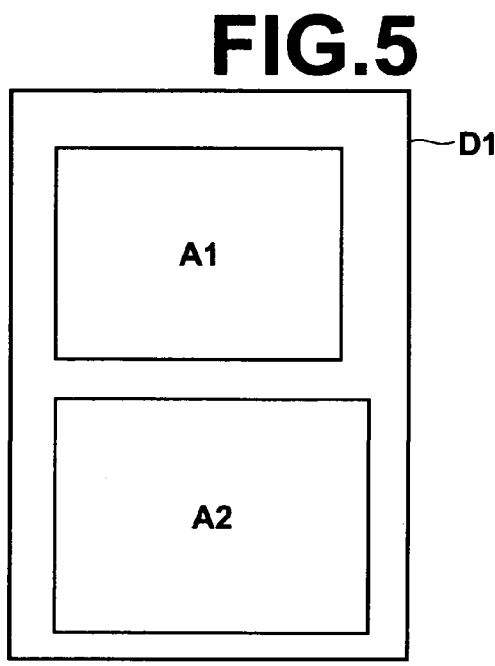
FIG. 5 shows an example of the layout image after editing in the first embodiment.

In this embodiment, assume that the user has edited the layout image D0 shown in FIG. 2 so that the image A3 is deleted and only the images A1 and A2 are laid out in the background area G0 with the size of the image A2 being increased, as shown in FIG. 5. The layout image after the editing is referred to as a layout image D1.

The preference information generation unit 36 generates user preference information F0 based on a result of the editing carried out by the user and the parameters P1 through P4 of the images edited by the user. The user preference information F0 is generated in the following manner. In the case where the user has enlarged the image A2 and deleted the image A3 as shown in FIG. 5, the preference information generation unit 36 refers to the parameters P1 through P4 of the edited images A2 and A3. Assume that the image A2 is a portrait image (that is, P1=1), and has high lightness with moderate contrast and low sharpness, while the image A3 is a landscape image (P1=0) with low lightness, high contrast, and high sharpness.

The parameters P2, P3, and P4 are calculated as values respectively representing lightness, contrast, and sharpness, and are respectively classified into 3 levels corresponding to high, intermediate, and low ranges of the values. For example, in the case where the lightness ranges from 0 to 255, the ranges from 0 to 85, from 86 to 171, and from 172 to 255 are respectively classified into low, intermediate, and high lightness. In the case where the contrast ranges from 0 to 100, the ranges from 0 to 33, from 34 to 66, and from 67 to 100 are respectively classified into low, intermediate, and high contrast. In the case where the sharpness ranges from 0 to 100, the ranges from 0 to 33, from 34 to 66, and from 67 to 100 are respectively classified into low, intermediate, and high sharpness.

The preference information generation unit 36 compares the parameters of the enlarged image A2 and the deleted image A3, and infers which of the characteristics in image quality weighs with the user. For example, the enlarged image A2 is a portrait image with high lightness, intermediate contrast, and low sharpness while the deleted image A3 represents a landscape with low lightness, high contrast, and high sharpness. Therefore, it is inferred that being a portrait image and lightness are important for the user while contrast and sharpness are not so important. Therefore, the preference information generation unit 36 generates a text file describing the preferences of the user as the user preference information F0. The description of the file is shown in FIG. 6 where "1" refers to being important while "0" refers to not important.

The feedback unit 38 feeds back the preferences of the user to the weight calculation unit 32 with reference to the user preference information F0, for preparing for the case where the same user carries out layout image generation again. More specifically, the feedback unit 38 instructs the weight calculation unit 32 to change the weight coefficients W1 through W4 used for calculation of the weight L0 according to the user preference information F0.

In response to the instruction, the weight calculation unit 32 changes the weight coefficients W1 through W4 used for calculation of the weight L0. In the case where the user preference information F0 is as shown in FIG. 6, being a portrait image and lightness are important for the user while contrast and sharpness are not so important. Therefore, the weight coefficients W1 and W2 for the parameter P1 regarding subject and the parameter P2 regarding lightness are increased while the weight coefficients W3 and W4 for contrast and sharpness are decreased, for calculation of the weight L0. For example, in the case where (W1, W2, W3, W4)=(0.4, 0.2, 0.2, 0.2), the weight coefficients W1 through W4 are changed to become (W1, W2, W3, W4)=(0.45, 0.25, 0.15, 0.15).

The weight calculation unit 32 calculates the weight L0 by using the weight coefficients W1 through W4 after the change, when the same user carries out layout image generation again. The layout image generation unit 34 lays out each of images by increasing the image size more as the weight L0 calculated by the weight calculation unit 32 becomes larger. In the case where the images A1 to A3, which were used in the case of generating the user preference information F0, are laid out, the weight L0 for the image A2 becomes larger than the weight L0 calculated for the first time, while the weight L0 for the image A3 becomes smaller than the weight L0 calculated for the first time. Therefore, in the layout image D0 generated for the second time, the image A2 is larger but the image A3 is smaller than in the layout image D0 shown in FIG. 2 generated for the first time, as shown in FIG. 7.

Figure 8:
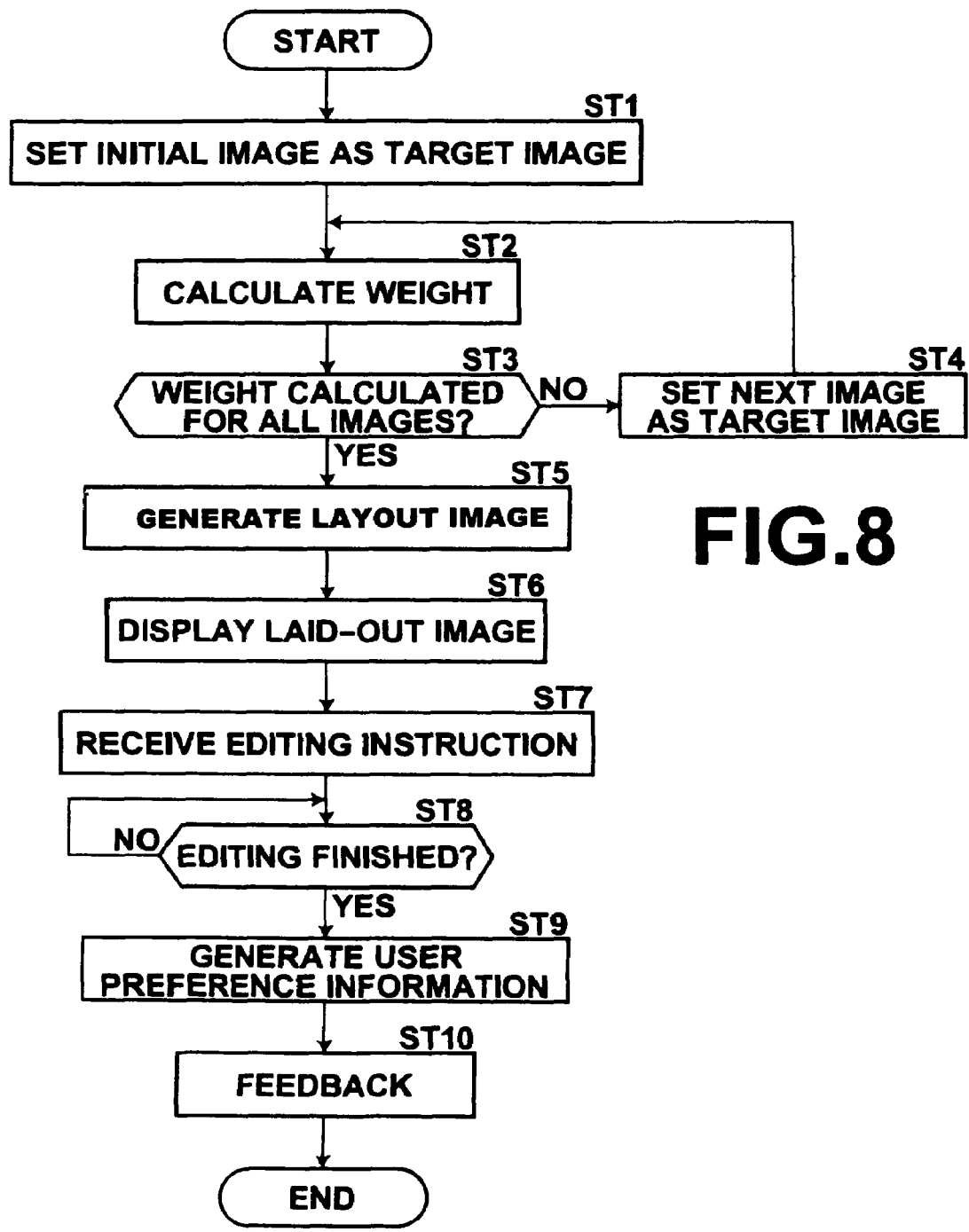
FIG. 8 is a flow chart showing a procedure carried out in the first embodiment.

A procedure carried out in the first embodiment will be described next. FIG. 8 is a flow chart showing the procedure carried out in the first embodiment. The procedure starts when the user inputs an instruction to lay out the images from the input unit 16, and an initial image is set to be a target image (Step ST1). The initial image refers to an image listed first when the images are sorted according to file names, for example. The weight calculation unit 32 then calculates the weight L0 for the target image (Step ST2), and whether the weight has been calculated for all the images is judged (Step ST3). If a result at ST3 is negative, the next image is used as the target image (Step ST4), and the procedure returns to Step ST2.

If the result at Step ST3 is affirmative, the layout image generation unit 34 generates the layout image D0 according to the predetermined rules (Step ST5). The layout image is displayed on the display unit 18 (Step ST6), and an instruction to edit is received from the user (Step ST7). Monitoring is started as to whether the user has input an instruction to finish editing (Step ST8). If a result at Step ST8 is affirmative, the preference information generation unit 36 generates the user preference information F0 (Step ST9). The feedback unit 38 then feeds back the user preference information F0 to the weight calculation unit 32 (Step ST10) to end the procedure.

The layout image D0 is printed or stored in the memory card 2 according to an instruction by the user, for example.

As has been described above, in this embodiment, the preferences of the user are fed back for layout image generation at a subsequent time. Therefore, in the case where the subsequent layout image generation is carried out based on images owned by the same user, the result of editing carried out by the user in the previous time is reflected in the subsequent layout image generation. Since the user preference information is resulted from the editing carried out by the user himself/herself, the user preference information reflects the preferences of the user. Therefore, according to this embodiment, the preferences of the user can be reflected in the subsequent layout image generation. Furthermore, since the preferences are reflected, the user repeats layout operations less frequently, which makes the image layout operations easy.

A second embodiment of the present invention will be described next. An image layout apparatus in the second embodiment has the same configuration as the image layout apparatus 1 in the first embodiment shown in FIG. 1, and carries out the same procedure as in the first embodiment except for processing carried out by the preference information generation unit 36 and the feedback unit 38.

In the second embodiment, the user instructs the apparatus to add a frame to a desired one of the images. As shown in FIG. 9 more specifically, the user adds a frame Fr0 to the image A1 in the layout image D0 shown in FIG. 2.

The preference information generation unit 36 generates user preference information F1 based on an instruction to edit input by the user and the parameters P1 through P4 of the image edited by the user. The user preference information F1 is generated in the following manner. In the case where the user adds the frame Fr0 to the image A1 as shown in FIG. 9, the preference information generation unit 36 refers to the parameters P1 to P4 of the edited image A1. Assume that the image A1 is a portrait image (that is, P1=1) and has intermediate lightness with high contrast and low sharpness.

The preference information generation unit 36 refers to the parameters P1 to P4 of the image A1 for inferring what the characteristics are in quality of the image to which the user added the frame Fr0. For example, the preference information generation unit 36 infers that the user added the frame Fr0 to the portrait image with intermediate lightness, high contrast, and low sharpness, as has been described above. The preference information generation unit 36 then generates a text file describing the preference as the user preference information F1. The description in the file is shown in FIG. 10 wherein "0", "1", and "2" respectively represent the low, intermediate, and high levels of the parameters. For the subject, only "0" or "1" is used. In the user preference information F1 is also described information "Frame: 1" corresponding to the instruction to add the frame Fr0.

The feedback unit 38 refers to the user preference information F1 for preparing for the case where the same user carries out layout image generation again, and feeds back the preference to the layout image generation unit 34. More specifically, a portrait image with intermediate lightness, high contrast, and low sharpness is detected for adding the frame Fr0 thereto in advance at the subsequent time of layout image generation.

In this manner, at the time of subsequent layout image generation from images owned by the same user, the result of editing carried out by the user in the previous time is reflected in the subsequent generation, and the frame Fr0 is added in advance to a portrait image with intermediate lightness, high contrast, and low sharpness for the layout image generation.

In the second embodiment, the user preference information F1 may be generated through calculation of a parameter P5 representing an image color tone and consideration of a color tone of the frame Fr0. For example, "0", "1", or "2" may be described in the user preference information F1 for respectively representing red, blue, and green as the parameter P5 representing the image color tone and as the color tone of the frame Fr0. In this case, the frame Fr0 of the color tone corresponding to the image color tone is added to the image. For example, if the user preference information F1 describes "0" and "1" as the parameter P5 of image color tone and the color tone of the frame Fr0, adding a bluish frame to an image of reddish tone is inferred to be the preference of the user. Therefore, in the case where layout image generation is carried out again by using images owned by the same user, the result of editing carried out by the user in the previous time is reflected in the subsequent layout image generation, and the bluish frame Fr0 is added to a reddish image in advance for the layout image generation.

A third embodiment of the present invention will be described next. An image layout apparatus in the third embodiment has the same configuration as the image layout apparatus 1 in the first embodiment shown in FIG. 1, and carries out the same procedure as in the first embodiment except for processing carried out by the preference information generation unit 36 and the feedback unit 38.

Figures 11, 12:
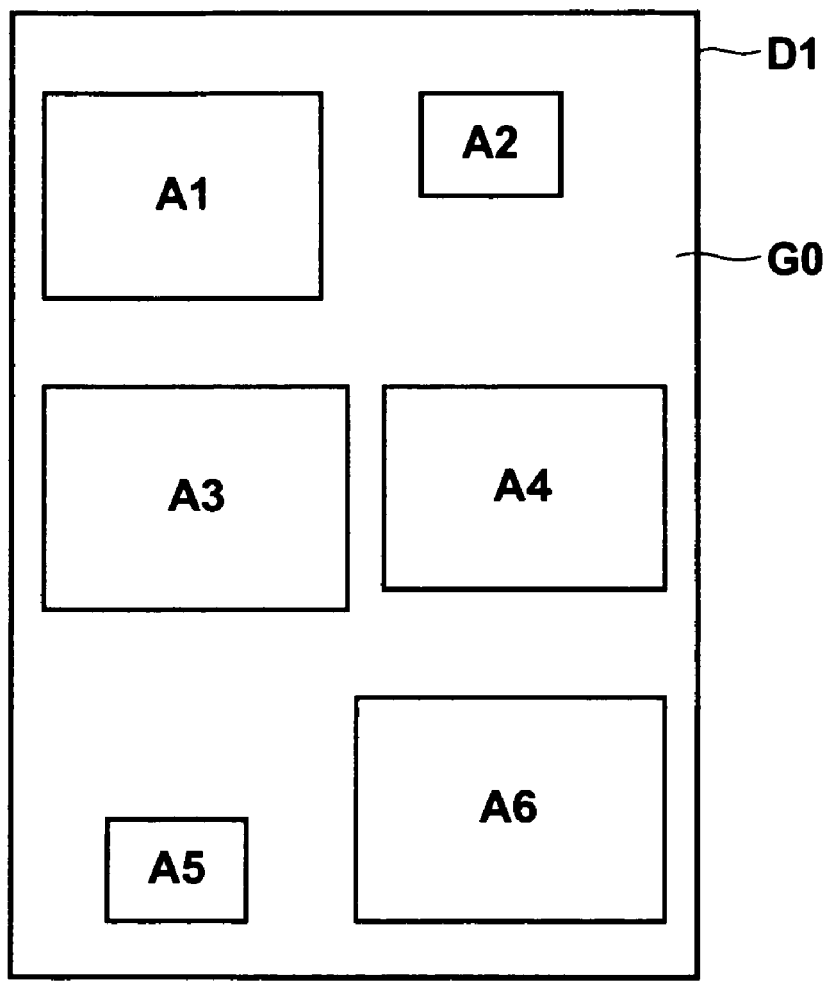
FIG. 11 shows an example of a layout image after editing in a third embodiment.
FIG. 12 shows an example of user preference information in the third embodiment.

In the third embodiment, the user instructs to change the number of images to be laid out in the background area G0. More specifically, the user instructs to edit in such a manner that a layout image D0 having 6 images in a background area G0 corresponding to two A4 sheets shown in FIG. 3 is changed to have 6 images in a background area G0 corresponding to one A4 sheet as shown in FIG. 11. At this time, sizes of images A1 through A6 are appropriately corrected according to the weight L0 of each of the images.

The preference information generation unit 36 generates user preference information F2 based on the editing instruction by the user. The user preference information F2 is generated in the following manner. In the case where the number of images to be included in the background area G0 corresponding to an A4 sheet is 6 as shown in FIG. 11, the preference information generation unit 36 generates a text file as the user preference information F2 in which the number of images is described to be 6, as shown in FIG. 12.

The feedback unit 38 refers to the user preference information F2 for preparing for the case where the same user carries out layout image generation again, and feeds back the preference to the layout image generation unit 34 with reference to the user preference information F2. More specifically, the feedback unit 38 sets the number of images to be included in the background area G0 to 6, for subsequent layout image generation.

In this manner, when layout image generation is carried out again by using images owned by the same user, the result of editing carried out by the user in the previous time is reflected in the subsequent layout image generation, and a layout image D0 is generated having 6 images laid out in the background area G0 corresponding to an A4 sheet.

In the embodiments described above, the weight L0 is calculated according to Equation (1). However, the weight L0 may be calculated from other image parameters such as image lightness at the time of image acquisition, sharpness of focus, and a degree of camera shake.

In the above embodiments, the image layout apparatus of the present invention is installed in a DPE store. However, a program for causing a computer to execute the processing carried out by the image layout apparatus of the present invention is another embodiment of the present invention. Furthermore, a computer-readable recording medium storing such a program is also an embodiment of the present invention.

What is claimed is:

1. An image layout apparatus comprising:
   layout image generation means for carrying out layout image generation wherein a layout image is generated by laying out images in a background area according to a predetermined rule;
   editing means for editing the layout image by receiving an instruction to edit the layout image from a user;
   preference information generation means for generating user preference information representing preference of the user, based on a result of editing according to the instruction to edit;
   feedback means for feeding back user preference information into the layout image generation carried out at a subsequent time;
   parameter calculation means for calculating parameters representing characteristics in quality of each of the images, wherein the preference information generation means generates the user preference information based on the parameters of the images in an edited image in addition to the result of editing; and
   weight calculation means for calculating a weight of each of the images as a sum of the parameters weighted by predetermined weight coefficients,
   wherein the feedback means feeds back the user preference information into the weight coefficients, in a case where the predetermined rule is to lay out the images in the background area in such a manner that a size of each of the images becomes larger as the weight thereof becomes higher, and
   wherein the instruction to edit includes an instruction to delete, reduce, or enlarge a specific one of the images.

2. The image layout apparatus according to claim 1, wherein the parameters comprise a parameter identifying a subject in each of the images, a parameter for lightness thereof, a parameter for contrast thereof, and a parameter for sharpness thereof.

3. The image layout apparatus according to claim 1, wherein the feedback means feeds back the user preference information into judgment as to whether a frame is added in advance to an image to be laid out, in a case where the instruction to edit is an instruction to add a frame to a specific one of the images.

4. The image layout apparatus according to claim 1, wherein the feedback means feeds back the user preference information into a number of images to be laid out in the background area, in a case where the instruction to edit includes an instruction to change the number of images to be laid out in the background area.

5. The image layout apparatus according to claim 1, wherein for each of the images, the weight calculation means, calculates the weight based on a multiplication of respective parameters of identifying a subject, lightness, contrast, and sharpness, found by the parameter calculation means, by a corresponding one of said predetermined weight coefficients, and adding a result of the multiplication.

6. The image layout apparatus according to claim 1, wherein, when the user edits the layout image, the preference information generation means compares parameters of an enlarged image and a deleted image, and infers characteristics in image quality which weigh with the user.

7. The image layout apparatus according to claim 1, wherein the preference information generation means generates a text file describing preferences of the user as the user preference information.

8. The image layout apparatus according to claim 1, wherein the feedback means instructs the weight calculation means to change weight coefficients for calculating the weight according to the user preference information.

9. The image layout apparatus according to claim 1, wherein for each of the images, the weight calculation means calculates the weight based on a multiplication of respective parameters of image lightness at a time of image acquisition, sharpness of focus, and a degree of camera shake, found by the parameter calculation means, by a corresponding one of said predetermined weight coefficients, and adding a result of the multiplication.

10. An image layout method, comprising:
    carrying out layout image generation on a computer, wherein a layout image is generated by laying out images in a background area according to a predetermined rule;
    editing the layout image by receiving an instruction to edit the layout image from a user;
    generating user preference information representing preference of the user, based on a result of editing according to the instruction to edit; and
    feeding back user preference information into the layout image generation carried out at a subsequent time;
    calculating parameters representing characteristics in quality of each of the images, wherein the generating user preference information includes generating the user preference information based on the parameters of the images in an edited image in addition to the result of editing; and
    calculating a weight of each of the images as a sum of the parameters weighted by predetermined weight coefficients,
    wherein the feeding back includes feeding back the user preference information into the weight coefficients, in a case where the predetermined rule is to lay out the images in the background area in such a manner that a size of each of the images becomes larger as the weight thereof becomes higher, and
    wherein the instruction to edit includes an instruction to delete, reduce, or enlarge a specific one of the images.

11. The image layout method according to claim 10, wherein in said calculating the weight of each of the images, for each of the images, the weight is calculated based on a multiplication of respective parameters of identifying a subject, lightness, contrast, and sharpness, by a corresponding one of said predetermined weight coefficients, and adding a result of the multiplication.

12. The image layout method according to claim 10, wherein, when the user edits the layout image, the feeding back includes comparing parameters of an enlarged image and a deleted image, and inferring characteristics in image quality which weigh with the user.

13. The image layout method according to claim 10, wherein the feeding back comprises generating a text file describing preferences of the user as the user preference information.

14. The image layout method according to claim 10, wherein the feeding back includes instructing to change weight coefficients for calculating the weight according to the user preference information.

15. The image layout method according to claim 10, wherein in said calculating the weight of each of the images, the weight is calculated based on a multiplication of respective parameters of image lightness at a time of image acquisition, sharpness of focus, and a degree of camera shake, by a corresponding one of said predetermined weight coefficients, and adding a result of the multiplication.

16. A computer-readable storage medium encoded with a computer program to execute an image layout method, comprising:

carrying out layout image generation wherein a layout image is generated by laying out images in a background area according to a predetermined rule;

editing the layout image by receiving an instruction to edit the layout image from a user;

generating user preference information representing preference of the user, based on a result of editing according to the instruction to edit; and feeding back user preference information into the layout image generation carried out at a subsequent time;

calculating parameters representing characteristics in quality of each of the images, wherein the generating user preference information includes generating the user preference information based on the parameters of the images in an edited image in addition to the result of editing; and calculating a weight of each of the images as a sum of the parameters weighted by predetermined weight coefficients, wherein the feeding back includes feeding back the user preference information into the weight coefficients, in a case where the predetermined rule is to lay out the images in the background area in such a manner that a size of each of the images becomes larger as the weight thereof becomes higher, and wherein the instruction to edit includes an instruction to delete, reduce, or enlarge a specific one of the images.

17. The computer-readable storage medium according to claim 16, wherein in said calculating the weight of each of the images, for each of the images, the weight is calculated based on a multiplication of respective parameters of identifying a subject, lightness, contrast, and sharpness, by a corresponding one of said predetermined weight coefficients, and adding a result of the multiplication.

18. The computer-readable storage medium according to claim 16, wherein, when the user edits the layout image, the feeding back includes comparing parameters of an enlarged image and a deleted image, and inferring characteristics in image quality which weigh with the user.

19. The computer-readable storage medium according to claim 16, wherein the feeding back comprises:

generating a text file describing preferences of the user as the user preference information, and instructing to change weight coefficients for calculating the weight according to the user preference information.

20. The computer-readable storage medium according to claim 16, wherein in said calculating the weight of each of the images, the weight is calculated based on a multiplication of respective parameters of image lightness at a time of image acquisition, sharpness of focus, and a degree of camera shake, by a corresponding one of said predetermined weight coefficients, and adding a result of the multiplication.

* * * * *